May 6, 1969  R. D. HALL  3,442,767
STRIPPING OPERATION WITHOUT OVERHEAD REFLUX AND
THE CONTROL OF THE WATER
CONTENT IN THE SYSTEM
Filed May 16, 1968
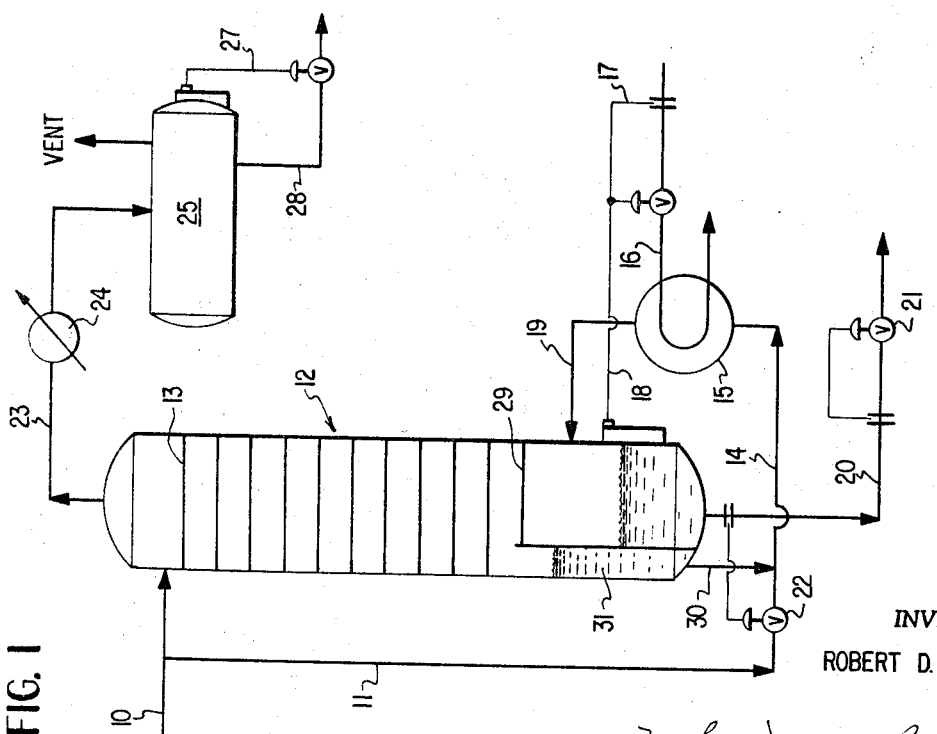
INVENTOR
ROBERT D. HALL
BY McLean, Morton & Boustead
ATTORNEYS.

United States Patent Office 3,442,767
Patented May 6, 1969

3,442,767
STRIPPING OPERATION WITHOUT OVERHEAD REFLUX AND THE CONTROL OF THE WATER CONTENT IN THE SYSTEM
Robert D. Hall, Homewood, Ill., assignor to Sinclair Research, Inc., New York, N.Y., a corporation of Delaware
Filed May 16, 1968, Ser. No. 729,791
Int. Cl. B01d 3/42
U.S. Cl. 203—2                                  8 Claims

ABSTRACT OF THE DISCLOSURE

A stripping operation without overhead reflux wherein the concentration of the material being separated remaining in the bottoms product is controlled by providing a bypass of material around the stripper tower which alters the degree of separation in the system. In one embodiment, a feed slip stream is fed to the bottoms reboiler in inverse proportion to the degree of separation achieved in the tower. In a second embodiment, a bottoms reboiler vapor by-pass is provided which passes the vapor to an overhang condenser, altering the effectiveness of the separation in the tower.

---

This invention relates to a separation system. More particularly, the invention relates to a stripping operation wherein the degree of separation is readily and simply controlled. In one of its aspects, the invention concerns a method whereby a stripping operation is controlled by apportionment of the feed to different zones of the distillation system. In another aspect, the invention relates to a method whereby a stripping operation is controlled by apportionment of bottoms reboiler vapor in the system. In all aspects, the present invention provides a method for controlling the degree of separation by a short-circuiting effect.

In stripping operations, it can be desirable to conduct the process to achieve a limited separation of components of the feed stream. Such operations are commonly conducted to provide a distillate or distillation bottoms which contains a controlled and fixed amount of the separable component. Since a feed material to a stripping operation can often vary widely in composition, it is necessary to provide distillation capacity in such operations which is sufficient to accommodate large variations in amounts of low boiling components in the feed. Accordingly, when small amounts of such low boiling components are present, there often is an excess of distillation capacity in a stripping operation.

For instance, in the manufacture of isophthalic or terephthalic acid by a two stage oxidation process in which the xylene feed is oxidized in the first stage to the corresponding toluic acid and in the second stage from this acid is oxidized to the corresponding phthalic acid, a stream of dissolved catalyst and reaction solvent can be recycled to the reaction zone after separation of the product and removal of by-product impurities. The solubility characteristics of the catalyst make desirable a minimum water concentration in the recycle, e.g. in the case of isophthalic acid of no less than about one tenth weight percent since at least an amount of water sufficient to solubilize the catalyst is advantageous. The reaction kinetics, on the other hand, are such that the product yield is an inverse function of recycle water concentration so that significantly greater amounts of water are undesirable and close conrol over its concentration is desired. This combination of effects makes it advantageous that the water concentration in the feed to the reactor be maintained close to one percent in the isophthalic acid system. Thus the composition and rate of the recycle stream are fixed by the requirements of the reaction and must both be controlled. The water content of the recycle solvent stream fed to the separation zone, after removal of the product acid, may, however, vary widely according to variations in processing and in the recovery of the catalyst from the system. Ordinarily water will comprise at least about 2 to 3 weight percent, often about 5 to 6 weight percent or even 20 to 30 weight percent or more of the stream. For the production of isophthalic acid, or terephthalic acid, from, respectively, metaxylene or paraxylene, therefor, it is frequently desirable to reduce the water content of the recycle stream to insure that the water present in the feed to the first oxidation stage will only be an amount sufficient to insure solubilization of the cobalt catalyst system for the oxidation reaction, e.g. generally above about 0.1 weight percent, but below about 4, or 3 weight percent, based upon the feed to the first oxidation stage. Preferably, water is present in the feed to the first stage reactor in amounts of about 0.5 to 1.5 weight percent.

The desired degree of separation of water from such an isophthalic or terephthalic acid solvent recycle stream can be attained by a simple stripping operation, i.e., with the introduction of the feed on the top tray of a still with three equilibrium stages and no overhead reflux. Since only three stages are required, it would not be economical, to employ overhead reflux to reduce the stage requirements of the still. On the other hand, it is not normally possible to control the rate and composition of a stream from a non-refluxing stripper and a great deal of flexibility is lost with the elimination of the reflux. Since the three stages still is sufficient to accommodate water levels of 10 to 20 weight percent in the recycle stream, when water constitutes a lesser proportion of the recycle stream there is an excess of separation capacity which can result in an insufficiency of water in the recycle stream. In the isophthalic acid system insufficient amounts of water in the stream returned to the reactor can result in precipitation of the cobalt acetate catalyst in solid form, with a resulting loss of process effectiveness and problems of plugging of lines and traps and the like. Accordingly, this invention is directed to an improvement over the simple stripping column which permits easy control of the concentration of the water in the stream to be recycled in the phthalic acid production system.

Problems similar to the water concentration in such solvent recycle streams can be found in other systems where there can be other considerations which dictate control of liquid bottoms concentration. For instance, there are many multicomponent systems wherein concentration of a volatile component is adjusted and, if the concentration of the volatile component becomes too low, decomposition of another of the components might occur at the temperature of the system. Thus, control of the separation as in the present invention is not limited to the isophthalic acid system, but is applicable to various systems and operations where the degree of separation must be or should be controlled, whatever the reasons.

In accordance with this invention, reflux is replaced as a control variable by a short circuit-type operation involving the separatory still. In a first aspect, the short circuit is achieved by passing a feed slip stream to the reboiler of the still, thereby by-passing the still, with the slip stream being combined with liquid from the bottom tray of the still as feed for the reboiler. The feed to the reboiler in such a case must have a greater water content than the still bottoms and enough so that the liquid effluent from the reboiler has the bottoms composition desired. By these steps the bottoms composition may be used as an indicator and as a basis for controlling the slip stream rate. When in this operation thermal equilibrium is obtained, the temperature of the bottoms can be used as an indication of its composition. In a second embodiment of the invention, the short circuiting effect is achieved by withdrawing vapors from the reboiler and by-passing the withdrawn vapors around the separating still. The vapors by-passing the still can conveniently be passed to the overhead line of the separatory still for disposition. The bottoms temperature, as a measure of composition, is a convenient basis for controlling the vapor by-pass rate. Increasing the by-pass rate reduces the ratio of vapor to liquid in the tower.

The present invention will be more fully understood from the following detailed description with reference to the attached drawing in which FIGURES 1 and 2 are flow sheets illustrating the first and second embodiments of this invention.

Referring now to FIGURE 1, a liquid, multicomponent, feed stream containing a separable component, i.e. a component more volatile than other components, the concentration of which in the feed stream is to be reduced and controlled, enters the system through line 10 and is passed into still 12 above the top tray 13. The feed is separated into liquid and vapor phases (fractionally distilled) as the material passes down the tower which has a plurality of trays. The number of trays desired is a matter of design well known to one skilled in the art. In general, at least one tray and preferably two trays, or more, will be used in practicing this invention. A slip stream of the feed is removed from line 10 through line 11 and passes through line 14 to reboiler 15. The liquid material exiting from the bottom tray 29 passes into side pocket 31 from which it is removed through line 30 and line 14 to the reboiler 15. Heat is supplied to the reboiler by steam line 16 to vaporize a portion of the liquid material in line 14. The partially vaporized material is returned to the tower 12 via line 19 where the liquid portion is collected as bottoms product and the vapor portion is used as stripping vapor. The steam rate through line 16 can be controlled by flow recorder-controller 17, which in turn is actuated by liquid level controller 18. Bottoms from still 12 are removed via line 20, and are recycled to the reaction zone (not shown) at the required rate metered. Vapors leave the top of the still through line 23, pass through condenser 24, and then to accumulator, or gas-liquid separator 25. Liquid in the overhead is removed from accumulator 25 via line 28 which is controlled by liquid level controller 27.

The amount of slip stream passed to reboiler 15 can be conveniently controlled according to the composition of the tower bottoms in line 20, for example, by using the temperature of the bottoms as an indication of composition which in turn permits the use of temperature recorder controller 22 to control the rate of the feed slip stream in line 11. Other indicators of bottoms composition or analysis can also be used to control the rate of the by-passed slip stream. Still 12 is provided with sufficient capacity to accommodate large variations in the amount of the separable component in the feed. When lesser amounts of the separable component are present, a portion of the feed can be diverted through slip stream line 11 so as to by-pass still 12 and maintain the desired amount of separable component in the bottoms stream.

A second embodiment of the invention is illustrated in FIGURE 2. The operation of the system is similar to that described with reference to FIGURE 1 and like reference numerals are used where possible, however, instead of a feed slip stream, a vapor by-pass line 11' is provided. Increasing the by-pass rate reduces the ratio of vapor to liquid flow in still 12 and thereby the effectiveness of the stripping operation in the still. The vapor by-pass rate is determined by temperature recorder-controller valve 22'. A minimum pressure drop across the by-pass control valve 22' is required in order for the valve to operate effectively. This minimum requirement may be greater than the pressure drop through the tower, therefore a back-pressure valve 26 may be necessary to increase the pressure differential between the accumulator and the reboiler. In either embodiment of the invention described above, the desired control is simply and accurately achieved at far less cost than with overhead reflux.

EXAMPLE

In the production of isophthalic acid by the liquid phase air oxidation of meta-xylene in the presence of a cobalt acetate catalyst in acetic acid, a fractionator is provided to recover acetic acid and a controlled amount of recycle stream, containing the appropriate amount of water. The acetic acid stream can be utilized in other parts of the system such as, for example, for product purification and/or catalyst recovery and regeneration. The fractionator is provided with a feed slip-stream control as shown in FIGURE 1, and comprises a still 12 having 6 theoretical plates of separting capacity.

The feed, entering via line 10 from the reaction zone, is passed to the top tray 13 of the still 12. Acetic acid and water are removed as overhead vapor via line 23, and are passed through condenser 24 to vented accumulator 25. The liquid phase passes down still 12 to the bottom tray 29 which is provided with a side-pocket 31 as in FIGURE 1. The liquid phase is removed from attached pocket 31 via line 30 and passed to steam reboiler 15 where part of it is vaporized and returned via line 19 back to still 12 where the liquid portion is collected as bottoms product and the vapor portion is used as stripping vapor. Since the amount of water in the liquid phase determines the temperature of the tower bottoms, a high temperature indicates an insufficiency of water for the reactor recycle stream and an increment of feed is diverted via line 11, in an amount sufficient to provide the requisite proportion of water, into line 14 where it is combined with the liquid phase from bottom tray 29, and is routed through the steam reboiler 15 to the bottoms zone. With a total feed averaging about 156 gallons per minute with an 3.93 weight percent average of water and a recycle stream averaging about 42 gallons per minute of about 1.1 weight percent water, the acetic acid-water in the overhead averages about 114 gallons per minute, and the feed slip stream diverted to short circuit the separation averages about 60 gallons per minute. The feed and effluent material balance for the system is shown in the following table.

TABLE

| Component | Feed, M/H | Overhead, M/H | Bottoms, M/H |
|---|---|---|---|
| Meta-toluic acid | 1.62 | | 1.62 |
| Ortho-toluic acid | .01 | | .01 |
| Para-toluic acid | .01 | | .01 |
| Isophthalic acid | 1.78 | | 1.78 |
| Phthalic acid | 1.51 | | 1.51 |
| Terephthalic acid | .12 | | .12 |
| Benzoic acid | .40 | | .40 |
| Acetic acid | 1,296.16 | 946.15 | 350.01 |
| Cobaltous acetate | 3.02 | | 3.02 |
| Water | 180.00 | 166.07 | 13.93 |
| | 1,484.63 | 1,112.22 | 372.41 |

The system of FIGURE 2 is also operated as described above to control the water content in the stream fed to still 12 to about 1 wt. percent. As the concentration of water in the stream in line 20 varies, the temperature varies and the amount of vapors diverted through line 11' is adjusted thereby adjusting the water content in the stream. Increasing the bypass rate reduces the amount of water stripped from the feed stream.

I claim:

1. A process for controlling the degree of separation of a more volatile component from a less-volatile component in a multicomponent stream containing the same in a stripping tower having at least one tray and no reflux to produce a product having a desired concentration of the more volatile component in the multicomponent stream, comprising introducing the multicomponent stream into the tower, withdrawing a liquid stream from the bottom tray of said tower, diverting a slip-stream from the multicomponent stream prior to introduction of the multicomponent stream into the tower, combining the said liquid stream with the slip-stream of feed, heating and partially vaporizing the combined stream to produce a vapor portion and a liquid portion, passing the vapor and liquid portions into the stripping tower below the tray, withdrawing the liquid portion as bottoms product, the slip stream being added to the said liquid stream in an amount proportional to the concentration of the more volatile component in the tower bottoms below the bottom tray, so that the bottoms product has the desired concentration of the more volatile component.

2. The process of claim 1 wherein the composition of the bottoms is determined by measuring the temperature.

3. The process of claim 1 wherein the rate of said slip-stream is controlled by the temperature of the bottoms.

4. The process of claim 1 wherein the less-volatile component is acetic acid and the more-volatile component is water.

5. A process for controlling the degree of separation of a more volatile component from a less-volatile component in a mutlicomponent stream containing the same in a stripping tower having at least one tray and no reflux to produce a product stream having a desired concentration of the more volatile component and desired product rate, comprising introducing the multicomponent stream onto the top tray of said tower, separating the more-volatile component from the multicomponent stream in the tower, withdrawing an overhead stream of such component from the tower, withdrawing from the bottom tray a liquid stream, heating and partially vaporizing the said liquid stream and passing the heated and partially vaporized stream into the bottoms of the tower, withdrawing a portion of the vapors from the heated stream prior to introduction into the tower and combining the said withdrawn portion of the vapors with the overhead stream from the tower, and withdrawing the liquid in the bottoms of said tower as the product stream, the withdrawn portion being removed in amount proportional to the concentration of the more volatile component in the said liquid stream so that the product stream has the desired concentration of the more-volatile component.

6. The process of claim 5 wherein the amount of said portion of the vapors combined with said overhead stream is determined by the composition of liquid withdrawn from the bottoms.

7. The process of claim 6 wherein the temperature of said liquid withdrawn from the bottoms is utilized as a measure of composition.

8. The process of claim 5 wherein the less-volatile component is acetic acid and the more volatile component is water.

References Cited

UNITED STATES PATENTS

| | | | |
|---|---|---|---|
| 2,332,493 | 10/1943 | Petry et al. | 203—98 |
| 2,417,007 | 3/1947 | Meyers | 208—349 |
| 3,089,907 | 5/1963 | Saffer et al. | 260—524 |
| 3,301,778 | 1/1967 | Cabbage | 203—2 |
| 3,322,650 | 5/1967 | Hellburn | 203—2 |

WILBUR L. BASCOMB, JR., *Primary Examiner.*

U.S. Cl. X.R.

202—153, 160, 162; 203—3, 99, 98; 208—349; 260—524, 525, 541